US011956605B2

(12) United States Patent
Helie et al.

(10) Patent No.: US 11,956,605 B2
(45) Date of Patent: Apr. 9, 2024

(54) DEVICE FOR GENERATING A CONTROL SIGNAL FOR AN ELECTRICAL SYSTEM

(71) Applicants: Centre National de la Recherche Scientifique, Paris (FR); Institut de Recherche et de Coordination Acoustique/Musique, Paris (FR); Sorbonne Université, Paris (FR)

(72) Inventors: Thomas Helie, Paris (FR); Tristan Lebrun, Paris (FR)

(73) Assignees: CENTRE NATIONAL DE LA RECHERCHE SCIENTIFIQUE, Paris (FR); INSTITUT DE RECHERCHE ET DE COORDINATION ACOUSTIQUE/MUSIAUE, Paris (FR); SORBONNE UNIVERSITE, Paris (FR)

( * ) Notice: Subject to any disclaimer, the term of this patent is extended or adjusted under 35 U.S.C. 154(b) by 174 days.

(21) Appl. No.: 17/778,637

(22) PCT Filed: Nov. 19, 2020

(86) PCT No.: PCT/EP2020/082758
§ 371 (c)(1),
(2) Date: May 20, 2022

(87) PCT Pub. No.: WO2021/099509
PCT Pub. Date: May 27, 2021

(65) Prior Publication Data
US 2022/0408186 A1 Dec. 22, 2022

(30) Foreign Application Priority Data
Nov. 22, 2019 (FR) ...................................... 1913122

(51) Int. Cl.
*H04R 3/00* (2006.01)
*H04R 3/02* (2006.01)

(52) U.S. Cl.
CPC ...................................... *H04R 3/02* (2013.01)

(58) Field of Classification Search
CPC ........ H04R 3/02; H04R 3/007; H04R 29/001; H03G 7/002; H03G 7/007
See application file for complete search history.

(56) References Cited

U.S. PATENT DOCUMENTS

2010/0318205 A1 12/2010 Kazunobu et al.
2013/0259245 A1 10/2013 Chih-Chiang et al.

FOREIGN PATENT DOCUMENTS

CN 103945306 A 7/2014

OTHER PUBLICATIONS

Lebrun et al.; "Correction temps-reel d'un haut-parleur electrodynamique: Modélisation, mesures et asservissement"; Nov. 23, 2016, https://hal.archives-ouvertes.fr/hal-01466451/document.

*Primary Examiner* — Rasha S Al Aubaidi
(74) *Attorney, Agent, or Firm* — WCF IP

(57) ABSTRACT

The present invention relates to a device (40) for generating a control signal for an electrical system (S), comprising:
- an analog block (46) connected to the input (42) and to the output (44) of the generation device (40), the analog block (46) comprising an electrical circuit comprising a passive analog component, a measuring component and a generator,
- a digital block (50) comprising at least one digitally controllable component (70),
- the passive analog component of the electrical circuit being configured so as to generate the first component of the control signal and the generator of the electrical circuit being configured so as to generate the second component of the control signal, the electrical circuit (Continued)

Figure 1:
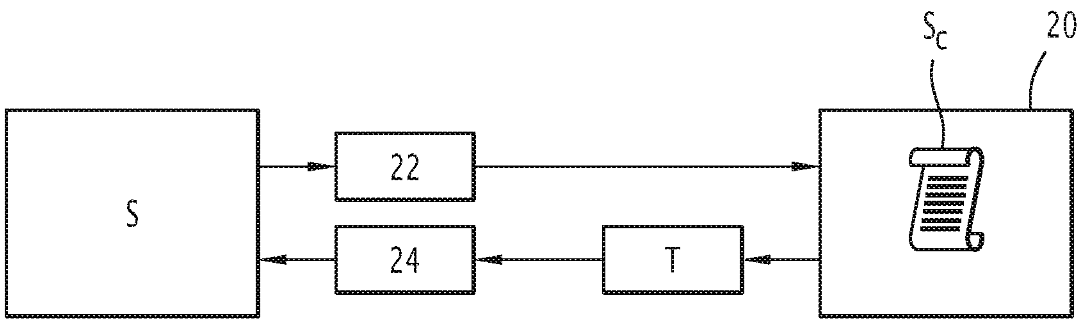

being configured so as to sum the first and the second component that are generated in order to obtain the control signal.

11 Claims, 8 Drawing Sheets

DEVICE FOR GENERATING A CONTROL SIGNAL FOR AN ELECTRICAL SYSTEM

The present invention relates to a device for generating a control signal for an electrical system. The present invention also relates to an audio system comprising such a device. The present invention also relates to an associated method.

Passivity describes the fact that a system cannot spontaneously create energy, but only store it and/or dissipate it. As an illustration, a network of resistances, diodes, coils or capacitors (linear or not) connected to a speaker will modify the mechanical and acoustic behavior of the speaker, but without generating sustained oscillations (Larsen effect) or instabilities. The passivity ensures this robustness. More generally, a passive physical system satisfies a power balance of type dE(t)/dt=Pext(t)−Pdis(t) (temporal variation of the stored energy=power contributed from the outside−dissipated power) with a positive dissipated power Pdis (or zero in the conservative case).

In the case of complex controls, the controls may be implemented in a real-time digital form, that is to say, using embedded systems comprising analog-digital converters, electric signal generators and a hardware digital computer. The calculation of the control signal is then rendered after a latency time, equivalent to a delay, which here is denoted T. Such a delay is inherent to any control done by digital hardware systems (microprocessor, DSP, microcontroller, FPGA) due to the time taken for the calculation.

Now, including a delay in a feedback loop may deteriorate the passivity property and thus make the control ineffective, or even cause destabilization thereof.

There is therefore a need for a device allowing passive control of a system.

To this end, the present description relates to a device for generating a control signal for an electrical system, the generation device comprising:

- an input for an input signal originating from the electrical system, the input signal being an analog signal representative of a voltage, of a current, respectively,
- an output for the control signal, the control signal being an analog signal representative of a current, of a voltage, respectively, the control signal having a first component and a second component,
- an analog block connected to the input and to the output of the generation device, the analog block comprising an electrical circuit comprising a passive analog component having a first passive characteristic impedance, a voltage, current, respectively, a measuring component and a current, voltage, respectively, generator,
- a digital block comprising at least one digitally controllable component,
- an analog-digital converter connected between the analog block and the digital block, and
- a digital-analog converter connected between the analog block and the digital block,
- the passive analog component of the electrical circuit being configured so as to generate the first component of the control signal and the generator of the electrical circuit being configured so as to generate the second component of the control signal, the electrical circuit being configured so as to sum the first and the second component that are generated in order to obtain the control signal,
- the analog-digital converter being configured to convert, into digital, a measurement of the input signal done by the measuring component of the analog block to obtain a converted input signal,
- the controllable component of the digital block being configured to generate a digital output signal as a function of the converted input signal and a model of a digital controller connected to a passive digital component having a second passive characteristic impedance, the value of the second characteristic impedance being chosen as a function of the value of the first characteristic impedance,
- the digital-analog converter being configured to convert, into analog, the digital output signal to obtain a control of the generator, the second component of the control signal generated by the generator being a function of the control obtained from the digital block.

According to other advantageous aspects, the generation device comprises one or more of the following features, considered alone or according to all technically possible combinations:

- the passive analog component and the passive digital component are of the same nature;
- each of the passive analog component and the passive digital component is a resistance;
- when the input signal is representative of a voltage and the control signal is representative of a current, the second characteristic impedance is greater than or equal to the first characteristic impedance, and
- when the input signal is representative of a current and the control signal is representative of a voltage, the second characteristic impedance is less than or equal to the first characteristic impedance;
- when the input signal is representative of a voltage and the control signal is representative of a current, the measuring component is a voltage measuring component and the generator is a current generator, the passive analog component being connected in parallel with the input and the output and in parallel with the generator and the measuring component, and
- when the input signal is representative of a current and the control signal is representative of a voltage, the measuring component is a current measuring component and the generator is a voltage generator, the passive analog component being connected in series with the generator and the measuring component between the input and the output;
- when the input signal is representative of a voltage and the control signal is representative of a current, the model is a model of the digital controller connected in series with the passive digital component, and
- when the input signal is representative of a current and the control signal is representative of a voltage, the model is a model of the digital controller connected in parallel with the passive digital component;
- the controllable component is configured to:
  - convert the converted input signal originating from the analog-digital converter into a first intermediate signal representative of a power wave, as a function of the second characteristic impedance,
  - convert the first intermediate signal into a second intermediate signal representative of a voltage, of a current, respectively, as a function of the second characteristic impedance,
  - calculate a third intermediate signal as a function of the second intermediate signal and of the model,
  - convert the third intermediate signal into a fourth intermediate signal representative of a power wave, as a function of the second characteristic impedance, and convert the fourth intermediate signal into the digital output signal of the controllable component as a function of the second characteristic impedance, the fourth intermediate signal being representative of a voltage, of a current, respectively.

the controllable component 70 is chosen from the list consisting of: a microprocessor, a digital signal processor, a microcontroller and an array of programmable gates.

The invention also relates to an audio system, such as a speaker, comprising a device as previously described.

The invention also relates to a method for generating a control signal for an electrical system from a generation device as previously described, the method comprising:

- receiving an input signal originating from the electrical system at the input of the generation device, the input signal being an analog signal representative of a voltage, of a current, respectively,
- converting, into digital, a measurement of the input signal done by the measuring component of the analog block to obtain a converted input signal,
- generating a digital output signal via the controllable component of the digital block,
- converting, into analog, the digital output signal to obtain control of the generator of the electrical circuit,
- generating the first component of the control signal via the passive analog component of the electrical circuit,
- generating the second component of the control signal via the generator of the electrical circuit as a function of the control obtained from the digital block, and
- summing the first component and the second component generated by the electrical circuit to obtain the control signal.

Figure 2:
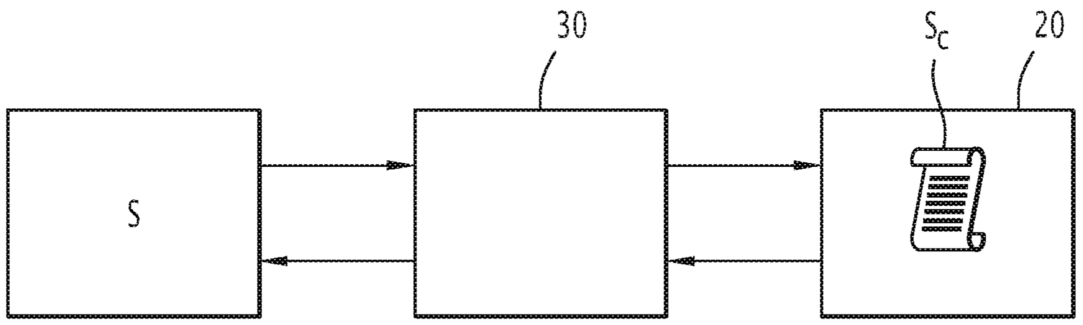
Figure 3:
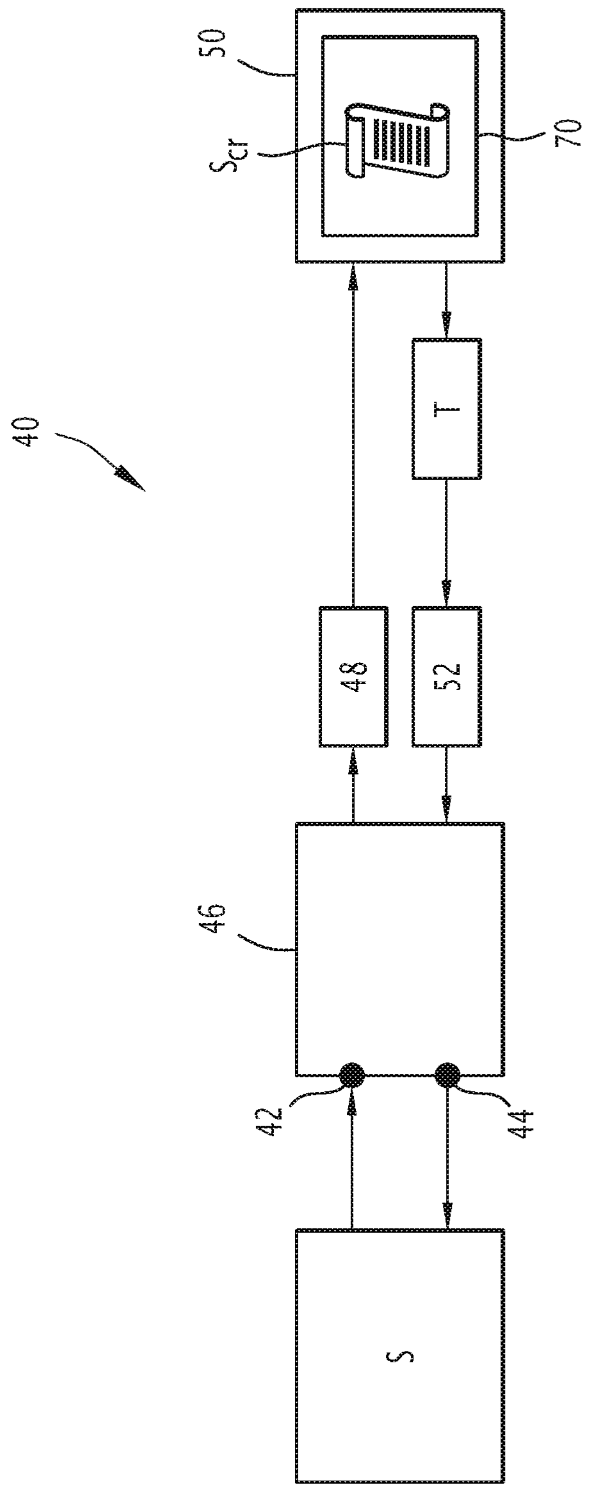
Figure 4:
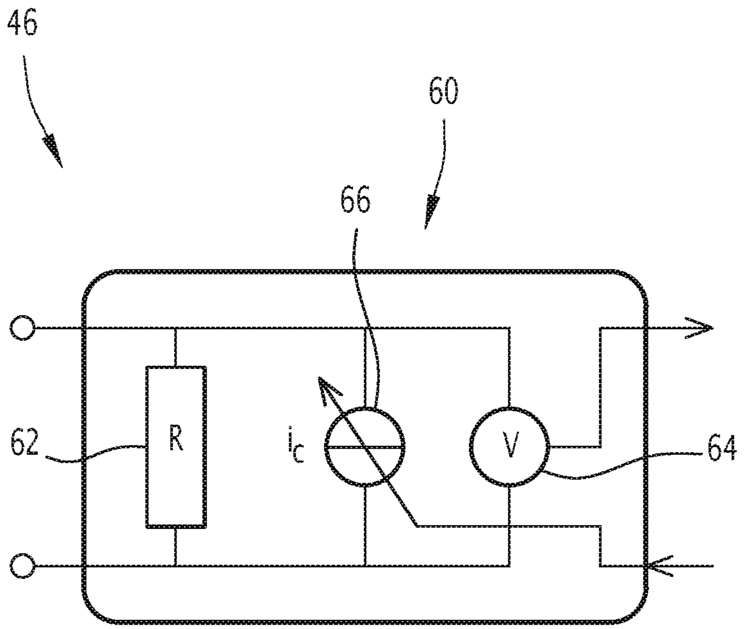
Figure 5:
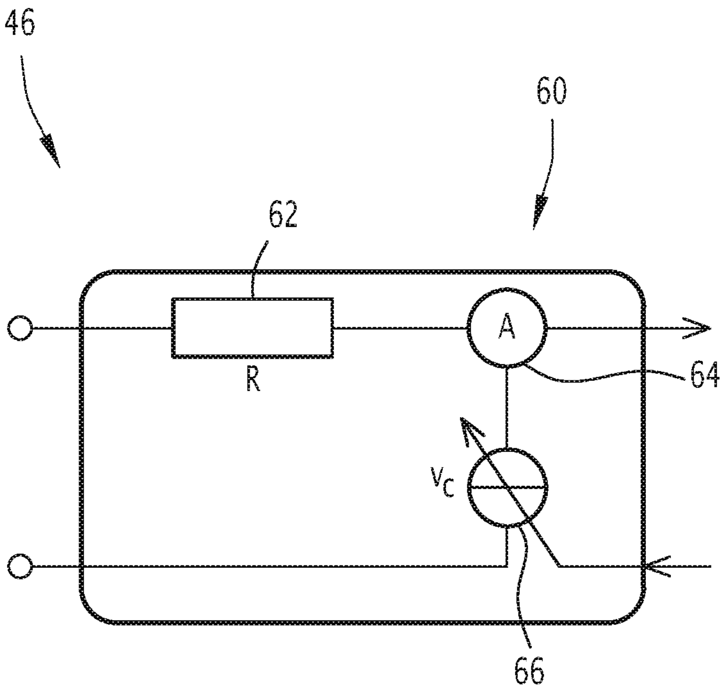
Figure 6:
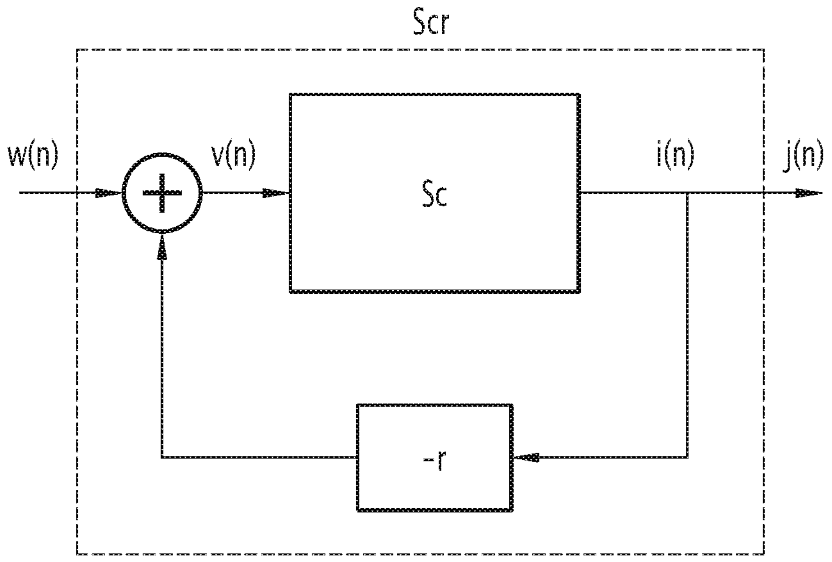
Figure 7:
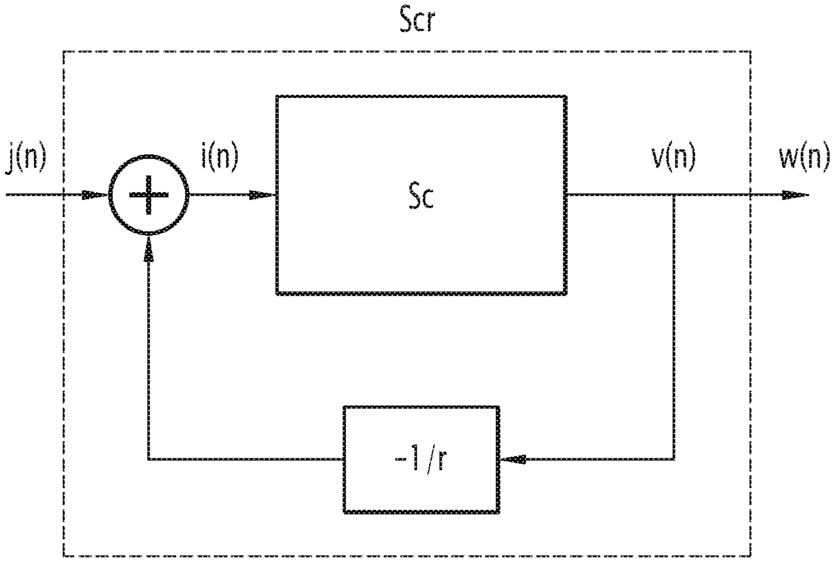
Figure 8:
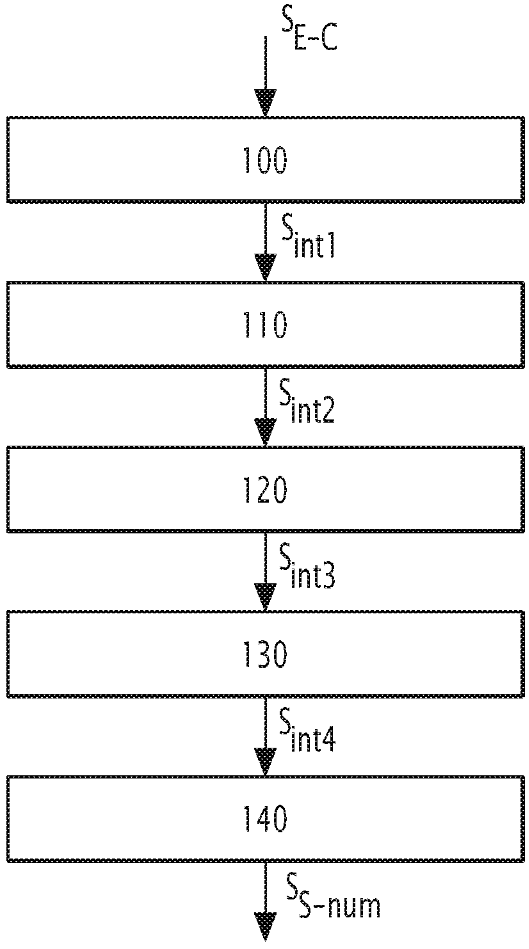

Other features and advantages of the invention will appear upon reading the following description of embodiments of the invention, solely as an example and done in reference to the drawings, which are:

FIG. 1, a schematic illustration of a direct connection between a physical system S and a digital controller Sc, FIG. 2, a schematic illustration of a connection of the physical system S of FIG. 1 to the digital controller Sc via a passive transmission line introducing a delay (T/2 outbound and T/2 inbound), FIG. 3, a schematic illustration of a connection of a physical system S to a delayed passive controller formed by a hardware analog block and a hardware digital block, FIG. 4, a schematic illustration of the analog block of FIG. 3 in the case of a controller of the admittance type, FIG. 5, a schematic illustration of the analog block of FIG. 3 in the case of a controller of the impedance type, FIG. 6, a schematic illustration of the system Scr comprising a controller Sc connected to an passive analog component in the case of a controller of the admittance type, FIG. 7, a schematic illustration of the system Scr comprising a controller Sc connected to an passive analog component in the case of a controller of the impedance type, and FIG. 8, a schematic illustration of a method implemented by the components of the digital block of FIG. 3.

GENERAL PRINCIPLE

FIG. 1 schematically illustrates the state of the art. In this FIG. 1, a physical system S to be electrically controlled is directly connected to a discrete-time passive digital controller Sc via a real-time hardware digital computer 20 and analog-digital 22 and digital-analog 24 converters. As shown in this FIG. 1, a delay T in the signal returned to the system S deteriorates the passivity property.

The principle of the invention consists in artificially encapsulating the delay T, intrinsic to the hardware computer, in a virtual passive electrical transmission line 30, shown in FIG. 2. Such a transmission line introduces a delay of T/2 outbound and of T/2 inbound. The principle at the origin of the artificial encapsulation of the delay T in a transmission line is summarized hereinafter.

The system S (Sc, respectively) has (at least) one electrical port characterized by a voltage Vs and a current Is (respectively voltage Vsc and current Isc). Let us virtually connect these two systems on either side of the transmission line. The propagation is described by two transport equations, the solutions of which are outbound/return waves, denoted $W^{+/-}$ (where, for a given system S or Sc, $W^+$ will designate the outbound wave and $W^-$ the inbound wave). A lossless, unidimensional transmission will be considered here, in a characteristic impedance medium r (in Ohms).

The variables of outbound/return waves associated with S and Sc are denoted $Ws^{+/-}$ and $Wsc^{+/-}$, respectively. The incoming wave in Sc at the instant t is equal to the outgoing wave of S at instant t−T/2, or $Wsc^-(t)=Ws^+(t-T/2)$, and reciprocally, $Ws^-(t)=Wsc^+(t-T/2)$ from S to Sc, which implies a total round-trip duration T.

The voltages (Vs, Vsc) and currents (Is, Isc) are converted into inbound/outbound wave variables $Ws^{+/-}$ and $Wsc^{+/-}$ via the following variable change:

$$W^{+/-}(t) = \sqrt{\frac{2}{r}}\,[V(t) + / - rI(t)], \tag{1}$$

which depends on the chosen characteristic impedance r. In particular, the conversion at the electrical port of S is expressed:

$$Vs(t) = \sqrt{\frac{r}{2}}\,Wsc^+(t - T/2) + rIs(t). \tag{2}$$

In (2), an instantaneous relationship (without delay) appears between Vs and Is through r. This relationship will be done physically by placing a passive analog component between S and the computer.

The rest of the conversion is implanted digitally in the computer, i.e. (i) the conversion (2) removed from the instantaneous relationship between Vs and Is, (ii) conversion (1) for Sc, linking (Vc, Ic) to ($Wsc^+$, $Wsc^-$).

Additionally, for stationary systems Sc, the delay T/2 between $Ws^+$ and $Wsc^-$ can be propagated between $Wsc^+$ and $Ws^-$, so as to equivalently consider a delay T between $Wsc^+$ and $Ws^-$ (and no delay between $Ws^+$ and $Wsc^-$).

Thus, rather than interfacing the physical system S directly with the passive digital controller Sc, the principle of the invention consists in:

- interfacing the physical system S with an analog circuit comprising a generator and a passive analog component, the impedance of the passive analog component being intended to represent the characteristic impedance of the virtual electrical transmission line,
- modifying the hardware digital computer 20 (according to an appropriate algorithm) such that the controller Sc is seen through the transmission line. This modification consists in simulating a system Scr (and no longer Sc)

encapsulated in a sequence of algebraic operations reproducing the previous equation (1).

This configuration allows integration of the intrinsic delay into the hardware computer in passive form.

Implementation of the General Principle

FIG. 3 illustrates a device 40 for generating a control signal of an electrical system S. "Electrical system" refers to an electrically controlled system.

The generation device 40 is a system of the admittance type or of the impedance type. A system of the admittance type is a system able to receive a voltage and to return a current. A system of the admittance type is a system able to receive a voltage and to return a current.

The generation device 40 comprises an input 42, an output 44, an analog block 46, an analog-digital converter 48, a digital block 50 and a digital-analog converter 52.

The input 42 is able to receive an input signal Vc, Ic originating from the electrical system S. The input signal Vc, Ic is an analog signal representative of a voltage Vc when the generation device 40 is of the admittance type and representative of a current Ic when the generation device 40 is of the impedance type.

The output 44 is able to send a control signal Is, Vs to the electrical system S. The control signal Is, Vs is an analog signal representative of a current Is when the generation device 40 is of the admittance type and representative of a voltage Vs when the generation device 40 is of the impedance type.

The analog block 46 is connected to the input 42 and to the output 44 of the generation device 40.

As illustrated by FIGS. 4 and 5, the analog block 46 comprises a hardware electrical circuit 60 comprising a passive analog component 62, a component 64 for measuring the input signal Vc, Ic and a generator 66.

In particular, as illustrated by FIG. 4 (Norton Type), when the generation device 40 is of the admittance type, the measuring component 64 is a voltage measuring component, such as a voltmeter, and the generator 66 is a current generator. The passive analog component 62 is connected in parallel between the input 42 and the output 44 and in parallel with the generator 66 and the measuring component 64.

In the example illustrated by FIG. 5 (Thevenin Type), when the generation device 40 is of the impedance type, the measuring component 64 is a current measuring component, such as an amperemeter, and the generator 66 is a voltage generator. The passive analog component 62 is connected in series with the generator 66 and with the measuring component 64 between the input 42 and the output 44.

In the example illustrated by FIGS. 4 and 5, the passive analog component 62 is a dissipative component, such as a resistance.

In a variant, the passive analog component 62 is a capacitor or a coil.

The electrical circuit 60 is configured to generate the control signal Is, Vs of the electrical system S resulting from the sum of a first component and a second component both generated by components of the electrical circuit 60.

More specifically, the passive analog component 62 of the electrical circuit 60 is configured to generate the first component of the control signal Is, Vs, resulting from the passage of the input signal Vc, Ic in the passive analog component 62. In the Norton case, the first component is a current I1. In the Thevenin case, the first component is a voltage T1.

The generator 66 of the electrical circuit 60 is configured to generate the second component of the control signal Is, Vs as a function of a control received by the generator 66. The control is generated by the digital block 50, as will be described in the remainder of the description. The generator 66 is thus controlled by the digital block 50 and generates the second component as a function of the received control originating from the digital block 50. In the Norton case, the second component is a current I2. In the Thevenin case, the second component is a voltage T2. The analog-digital converter 48 is connected between the output of the analog block 46 and the input of the digital block 50.

The analog-digital converter 48 is configured to convert, into digital, a measurement of the input signal Vc, Ic done by the measuring component 64 of the analog block 46 to obtain a converted input signal $S_{E\text{-}C}$ readable by the digital block 50.

The digital block 50 comprises at least one digitally controllable component 70. The controllable component 70 is a physical element. More specifically, the controllable component 70 is a computer.

For example, the digitally controllable component 70 is a microprocessor, a DSP ("Digital Signal Processor"), a microcontroller or an FPGA ("field-programmable gate array").

The controllable component 70 is configured to generate a digital output signal $S_{s\text{-}num}$ (corresponding to the digital control of the generator 66 of the electrical circuit 60) as a function of the converted input signal $S_{E\text{-}C}$ and a model Scr of a digital controller Sc connected to a passive digital component having a second characteristic impedance.

The passive analog component and the passive digital component are of the same nature. For example, each of the passive analog component 62 and the passive digital component is a resistance.

The value of the second characteristic impedance is chosen as a function of the value of the first characteristic impedance.

In particular, when the generation device 40 is of the admittance type, the second characteristic impedance is greater than or equal to the first characteristic impedance. When the generation device 40 is of the impedance type, the second characteristic impedance is less than or equal to the first characteristic impedance.

In fact, the transmission line is conservative if the first and the second characteristic impedance are equal. Nevertheless, in practice, the first characteristic impedance is known to within a precision, which prevents strict equality. For example, in the case of resistances, the first characteristic impedance is denoted R and the second characteristic impedance is denoted r. In the admittance case, r≥R and the power dissipated by the virtual line is given by $(1/R-1/r)*S_{s\text{-}num}^2 \geq 0$ where $S_{s\text{-}num}$ is the digital output signal. In the impedance case, r≤R and the power dissipated by the virtual line is given by $(R-r)*S_{s\text{-}num}^2 \geq 0$.

The digital controller Sc is a discrete-time dynamic system, linear or not, intended to control the electrical system S. This digital controller Sc is of the admittance type (voltage input v(n) and current output i(n)) or of the impedance type (current input i(n) and voltage output v(n)).

Advantageously, the digital controller Sc is passive, that is to say, satisfying equation $[E(n+1)-E(n)]/T=Pext(n)-Pdis(n)$ with $Pdis(n) \geq 0$, where the power contributed from the outside Pext(n) is the product "input·output," that is to say, in both cases, v(n)·i(n).

The model Scr of the digital controller Sc connected to the passive digital component corresponds to the addition of a feedback loop to the controller Sc. This model relates the new "voltage w(n) and current j(n)" pair.

In particular, in the example illustrated by FIG. 6, the passive digital component is an impedance resistance r and the generation device 40 is of the admittance type. In this case, the model Scr is a model of the digital controller Sc connected in series with the passive digital component with impedance r. The loop is expressed in the form: w(n)=v(n)+r·i(n) & j(n)=i(n). The power dissipated by the passive digital component is given by: $Pr(n)=r\cdot i(n)^2$.

In the example illustrated by FIG. 7, the passive digital component is a resistance with impedance r and the generation device 40 is of the impedance type. In this case, the model Scr is a model of the digital controller Sc connected in parallel with the passive digital component with impedance r. The loop is expressed in the form: w(n)=v(n) & j(n)=i(n)+v(n)/r. The power dissipated by the passive digital component is given by: $Pr(n)=v(n)^2/r$.

In these examples, the assembly Scr is passive because the passive digital component with impedance r adds dissipation to the controller Sc. In fact, since v(n)i(n)=−Pr(n)+w(n)j(n), the power balance becomes:

$$[E(n+1)-E(n)]/T=-[P\text{dis}(n)+Pr(n)]+w(n)\cdot j(n)$$

where w(n)·j(n) represents the power contributed to the assembly Scr from the outside, and where the power dissipated by the assembly Scr is Pdis(n)+Pr(n) Pdis(n) 0.

In one example, the digital controller Sc is described by the following equations. These equations are given in the case of a digital controller of the admittance type with input v(n) and output i(n). Such a controller is represented by:

a state vector x(n) of size $N_x$, an equation on the dynamics of its state as a function of the input v(n):

$$\delta x(n)/T=[J(x(n))-M(x(n))]\nabla_d H(x(n),\delta x(n))+G(x(n))v(n) \quad \text{(e.1)}$$

with $$x(n+1)=x(n)+\delta x(n);$$

J: anti-symmetric matrix of size $N_x \times N_x$;

M: positive symmetric matrix of size $N_x \times N_x$;

G: vector of size $N_x$;

H: positive defined regular scalar function;

$\nabla_d$: operator such that $\nabla_d H(x(n), \delta x(n))\cdot\delta x(n)=H(x(n+1))-H(x(n))$.

an equation on its output i(n):

$$i(n)=G(x(n))^T\nabla_d H(x(n),\delta x(n)). \quad \text{(e.2)}$$

The energy of the controller Sc is defined by E(n)=H(x(n)). According to (e.1) and (e.2), one may then write $$[E(n+1)-E(n)]/T=i(n)v(n)-\nabla_d H(x(n),\delta x(n))^T M(x(n))\nabla_d H(x(n),\delta x(n))$$

where $\nabla_d H(x(n), \delta x(n))^T M(x(n)) \nabla_d H(x(n), \delta x(n))\geq 0$ (positive or zero dissipated power).

The passivity of the discrete-time system is guaranteed by:

$$[E(n+1)-E(n)]/T\leq i(n)\cdot v(n).$$

The solver construction for equations (e.1) and (e.2) can be found in the literature (see for example the article by Itoh, T., & Abe, K. (1988). Hamiltonian-conserving discrete canonical equations based on variational difference quotients. Journal of Computational Physics, 76(1), 85-102; or the article by Falaize, A., & Flab, T. (2016). Passive guaranteed simulation of analog audio circuits: A port-Hamiltonian approach. Applied Sciences, 6(10), 273).

In this case, the model for the system Scr comprising the controller Sc connected to the passive digital component with impedance r is given by the following equations. First, the input-output loop associated with the system Scr is written (see FIG. 6):

$$v(n)=w(n)-r\cdot i(n),$$

which can be injected into equation (e.1), which leads to:

$$\delta x(n)/T=[J(x(n))-M^*(x(n))]\nabla_d H(x(n),\delta x(n))+G(x(n))w(n),$$

with M*(x(n))=M(x(n))+r GT(x(n)) G(x(n))≥0.

Thus, the same solver is usable to simulate Sc and Scr. In fact, to go from Sc to Scr, it suffices to replace M with M*, which have the same property (positive symmetrical matrix).

To generate the digital output signal $S_{s\text{-}num}$, the controllable component 70 is configured to implement a method comprising, for example, the steps illustrated in the flowchart of FIG. 8.

The method comprises a step 100 for converting the converted input signal $S_{E\text{-}C}$ originating from the analog-digital converter 48 into a first intermediate signal $S_{int1}$ as a function of the second characteristic impedance and representative of a power wave. More specifically, the first intermediate signal $S_{int1}$ represents the power wave of the virtual transmission line, that is to say, the wave transmitted from the physical system S to the digital controller Sc by the virtual transmission line of characteristic impedance r.

For example, when the generation device 40 is of the admittance type and the passive digital component is a resistance with impedance r, the first intermediate signal $S_{int1}$ is obtained by multiplying the converted input signal $S_{E\text{-}C}$ with $$\sqrt{\frac{2}{r}}$$

and by subtracting a fourth intermediate signal $S_{int4}$ obtained at the previous instant. The obtainment of the fourth intermediate signal $S_{int4}$ at the present instant is described in the remainder of the description.

For example, when the generation device 40 is of the impedance type and the passive digital component is a resistance with impedance r, the first intermediate signal $S_{int1}$ is obtained by multiplying the converted input signal $S_{E\text{-}C}$ with $\sqrt{2r}$ and by adding a fourth intermediate signal $S_{int4}$ obtained at the previous instant. The obtainment of the fourth intermediate signal $S_{int4}$ at the present instant is described in the remainder of the description.

The method comprises a step 110 of converting the first intermediate signal Sinti into a second intermediate signal $S_{int2}$ as a function of the second characteristic impedance representative of a voltage or a current to be applied to the controller Sc.

For example, when the generation device 40 is of the admittance type and the passive digital component is a resistance with impedance r, the second intermediate signal $S_{int2}$ is obtained by multiplying the first intermediate signal $S_{int1}$ with $\sqrt{2r}$.

For example, when the generation device 40 is of the impedance type and the passive digital component is a resistance with impedance r, the second intermediate signal $S_{int2}$ is obtained by multiplying the first intermediate signal $S_{int1}$ with $$\sqrt{\frac{2}{r}}.$$

The method comprises a step 120 of calculating a third intermediate signal $S_{int3}$ as a function of a second intermediate signal $S_{int2}$ and of the model Scr. The third intermediate signal $S_{int3}$ is therefore obtained by simulating the digital signal Scr, which reproduces the original passive system Sc interfaced with the transmission line of characteristic impedance r. This step thus makes it possible to obtain the current or voltage value output by the assembly formed by the controller Sc connected to the passive digital component.

When the generation device 40 is of the admittance type, the third intermediate signal $S_{int3}$ is representative of a current. When the generation device 40 is of the impedance type, the third intermediate signal $S_{int3}$ is representative of a voltage.

The method comprises a step 130 for converting the third intermediate signal Sinn into a fourth intermediate signal $S_{int4}$ as a function of the second characteristic impedance r and representative of a power wave.

For example, when the generation device 40 is of the admittance type and the passive digital component is a resistance with impedance r, the fourth intermediate signal $S_{int4}$ is obtained by multiplying the third intermediate signal $S_{int3}$ with $2r$ and by adding the first intermediate signal Sinti.

For example, when the generation device 40 is of the impedance type and the passive digital component is a resistance with impedance r, the fourth intermediate signal $S_{int4}$ is obtained by multiplying the third intermediate signal $S_{int3}$ with $$\sqrt{\frac{2}{r}}$$

and by subtracting the first intermediate signal Sinti.

The method comprises a step 140 for converting the fourth intermediate signal $S_{int4}$ into the digital output signal $S_{s\text{-}num}$ of the controllable component 70 as a function of the second characteristic impedance.

For example, when the generation device 40 is of the admittance type and the passive digital component is a resistance with impedance r, the digital output signal $S_{s\text{-}num}$ is obtained by multiplying the third intermediate signal $S_{int3}$ with $$\left(-\sqrt{\frac{2}{r}}\right).$$

For example, when the generation device 40 is of the impedance type and the passive digital component is a resistance with impedance r, the digital output signal $S_{s\text{-}num}$ is obtained by multiplying the third intermediate signal $S_{int3}$ with $(-\sqrt{2r})$.

The digital-analog converter 52 is connected between the input of the analog block 46 and the output of the digital block 50.

Advantageously, the analog-digital converter 48 and the digital-analog converter 52 are synchronized on a common clock signal.

The digital-analog converter 52 is configured to convert, into analog, the digital output signal $S_{s\text{-}num}$ to obtain an analog control of the generator 66 inducing the generation of the second component of the control signal Is, Vs by the generator 66.

The operation of the generation device 40 will now be described.

Initially, the generation device 40 receives, as input, an input signal Vc, Ic originating from the electrical system S.

The passive analog component 62 of the electrical circuit 60 generates the first component of the control signal Is, Vs as a function of the input signal Vc, Ic.

The generator 66 of the electrical circuit 60 generates the second component of the control signal Is, Vs as a function of a received control originating from the digital block 50.

The generated first component and second component are summed at the output of the electrical circuit 60 to form the control signal Is, Vs.

The control of the generator 66 is obtained by the following steps. A measurement of the input signal Vc, Ic is converted into digital by the analog-digital converter 48 to obtain a converted input signal $S_{E\text{-}C}$.

The controllable component 70 of the digital block 50 next generates a digital output signal $S_{s\text{-}num}$ corresponding to the digital control of the generator 66.

The digital output signal $S_{s\text{-}num}$ is converted into analog by the digital-analog converter 52, which makes it possible to obtain the analog control of the generator 66. As a function of the received control, the generator 66 generates the second component of the control signal Is, Vs.

Thus, the generation device 40 has been designed to passively regulate an electrically controlled system S. It in particular allows preservation of the passivity of the connection in the presence of a delay between a continuous-time system to be controlled and a discrete-time controller. The "continuous time/discrete time" specificity causes the results of the state of the art not to apply because they concern either only the continuous domain or only the digital domain.

By combining analog hardware elements (on the continuous-time part), digital hardware elements and algorithmic elements (on the discrete-time part), the generation device 40 allows realization of a "half-physical, half-digital" passive virtual transmission line.

The generation device 40 also accounts for the difficulty in combining the characteristic impedance of the transmission line in its physical hardware form R and its digital clone r by distinguishing them artificially in the development of the method. This approach combined with a dissipativity analysis leads to an order relationship between R and r: the method provides the conditions that make it possible to ensure passivity in view of the uncertainties regarding R (potential sensitivity to temperature, variations over time, etc.).

The generation device 40 is in particular intended to be used to control audio systems, such as speakers, in particular speakers corrected for hi-fi, acoustic absorbers for studios and concert halls, augmented musical instruments, or for the physical reconstruction of the linear or nonlinear impedance load of virtual instruments More generally, the generation device 40 is adaptable to any actuated physical system, such as vibration absorbers and acoustic absorbers for aeronautics and transportation, vibrating surface controllers (acoustic diffusion without speaker) or mechatronic system stabilizers.

One skilled in the art will understand that the invention is not limited to the examples described in the description. For example, it should be noted that additional information from physical sensors (signals conditioned and converted to digital) collected or not from the physical system S or digital signals (target trajectory, setting or other type of information) may be supplied to the controller Sc. It should also be noted that the digital controller could be replaced by a passive or balanced power system having a digital connection port.

The invention claimed is:

1. A device for generating a control signal for an electrical system, the device comprising:

an input for an input signal originating from the electrical system, the input signal being an analog signal representative of a voltage, of a current, respectively, an output for the control signal, the control signal being an analog signal representative of a current, of a voltage, respectively, the control signal having a first component and a second component, an analog block connected to the input and to the output of the device, the analog block comprising an electrical circuit comprising a passive analog component having a first passive characteristic impedance, a voltage, current, respectively, a measuring component and a current, voltage, respectively, generator, a digital block comprising at least one digitally controllable component, an analog-digital converter connected between the analog block and the digital block, and a digital-analog converter connected between the analog block and the digital block, the passive analog component of the electrical circuit being configured so as to generate the first component of the control signal and the generator of the electrical circuit being configured so as to generate the second component of the control signal, the electrical circuit being configured so as to sum the first and the second component that are generated in order to obtain the control signal, the analog-digital converter being configured to convert, into digital, a measurement of the input signal done by the measuring component of the analog block to obtain a converted input signal, the controllable component of the digital block being configured to generate a digital output signal as a function of the converted input signal and a model of a digital controller connected to a passive digital component having a second passive characteristic impedance, the value of the second characteristic impedance being chosen as a function of the value of the first characteristic impedance, the digital-analog converter being configured to convert, into analog, the digital output signal to obtain a control of the generator, the second component of the control signal generated by the generator being a function of the control obtained from the digital block.

2. The device according to claim 1, wherein the passive analog component and the passive digital component are of the same nature.

3. The device according to claim 1, wherein each of the passive analog component and the passive digital component is a resistance.

4. The device according to claim 1, wherein:

when the input signal is representative of a voltage and the control signal is representative of a current, the second characteristic impedance is greater than or equal to the first characteristic impedance, and when the input signal is representative of a current and the control signal is representative of a voltage, the second characteristic impedance is less than or equal to the first characteristic impedance.

5. The device according to claim 1, wherein:

when the input signal is representative of a voltage and the control signal is representative of a current, the measuring component is a voltage measuring component and the generator is a current generator, the passive analog component being connected in parallel with the input and the output and in parallel with the generator and the measuring component, and when the input signal is representative of a current and the control signal is representative of a voltage, the measuring component is a current measuring component and the generator is a voltage generator, the passive analog component being connected in series with the generator and the measuring component between the input and the output.

6. The device according to claim 1, wherein:

when the input signal is representative of a voltage and the control signal is representative of a current, the model is a model of the digital controller connected in series with the passive digital component, and when the input signal is representative of a current and the control signal is representative of a voltage, the model is a model of the digital controller connected in parallel with the passive digital component.

7. The device according to claim 1, wherein the controllable component is configured to:

convert the converted input signal originating from the analog-digital converter into a first intermediate signal representative of a power wave, as a function of the second characteristic impedance, convert the first intermediate signal into a second intermediate signal representative of a voltage, of a current, respectively, as a function of the second characteristic impedance, calculate a third intermediate signal as a function of the second intermediate signal and of the model, convert the third intermediate signal into a fourth intermediate signal representative of a power wave, as a function of the second characteristic impedance, and convert the fourth intermediate signal into the digital output signal of the controllable component as a function of the second characteristic impedance, the fourth intermediate signal being representative of a voltage, of a current, respectively.

8. The device according to claim 7, wherein the controllable component is chosen from the group consisting of: a microprocessor, a digital signal processor, a microcontroller and an array of programmable gates.

9. An audio system comprising a device according to claim 1.

10. The audio system of claim 9, wherein the audio system is a speaker.

11. A method for generating a control signal for an electrical system from a device according to claim 1, the method comprising:

receiving an input signal originating from the electrical system at the input of the device, the input signal being an analog signal representative of a voltage, of a current, respectively, converting, into digital, a measurement of the input signal done by the measuring component of the analog block to obtain a converted input signal, generating a digital output signal via the controllable component of the digital block, converting, into analog, the digital output signal to obtain control of the generator of the electrical circuit, generating the first component of the control signal via the passive analog component of the electrical circuit, generating the second component of the control signal via the generator of the electrical circuit as a function of the control obtained from the digital block, and summing the first component and the second component generated by the electrical circuit to obtain the control signal.

* * * * *